United States Patent
Shimazaki et al.

(10) Patent No.: US 12,460,163 B2
(45) Date of Patent: Nov. 4, 2025

(54) MEASUREMENT CELL MANUFACTURING METHOD AND MEASUREMENT CELL

(71) Applicant: Hitachi, Ltd., Tokyo (JP)

(72) Inventors: Yuzuru Shimazaki, Tokyo (JP); Tatsuo Nakagawa, Tokyo (JP); Junko Tanaka, Tokyo (JP); Akiko Shiratori, Tokyo (JP); Chihiro Uematsu, Tokyo (JP)

(73) Assignee: HITACHI, LTD.

( * ) Notice: Subject to any disclaimer, the term of this patent is extended or adjusted under 35 U.S.C. 154(b) by 1059 days.

(21) Appl. No.: 17/603,304

(22) PCT Filed: Apr. 2, 2020

(86) PCT No.: PCT/JP2020/015220
§ 371 (c)(1),
(2) Date: Oct. 12, 2021

(87) PCT Pub. No.: WO2020/217922
PCT Pub. Date: Oct. 29, 2020

(65) Prior Publication Data
US 2022/0195356 A1 Jun. 23, 2022

(30) Foreign Application Priority Data
Apr. 23, 2019 (JP) .................. 2019-081572

(51) Int. Cl.
*C12M 1/34* (2006.01)
*G01N 21/03* (2006.01)
*G01N 35/08* (2006.01)
*G01N 37/00* (2006.01)

(52) U.S. Cl.
CPC ............... *C12M 1/34* (2013.01); *G01N 21/03* (2013.01); *G01N 35/08* (2013.01); *G01N 37/00* (2013.01)

(58) Field of Classification Search
None
See application file for complete search history.

(56) References Cited

U.S. PATENT DOCUMENTS

2009/0071833 A1* 3/2009 Gorfinkel .......... B01L 3/502715
141/234
2015/0275292 A1* 10/2015 Chiang ................ C12Q 1/6876
506/9

FOREIGN PATENT DOCUMENTS

| JP | 2009180707 A | 8/2009 |
| JP | 2015532094 A | 11/2015 |
| WO | 2014052671 A1 | 4/2014 |

* cited by examiner

*Primary Examiner* — Lyle Alexander
*Assistant Examiner* — Mickey Huang
(74) *Attorney, Agent, or Firm* — Procopio Cory Hargreaves & Savitch LLP

(57) ABSTRACT

The present disclosure provides a technique capable of manufacturing a measurement cell having a high specimen utilization ratio in the case of using a measurement cell that introduces a specimen into a surface hole. In the measurement cell manufacturing method according to the present disclosure, a measurement cell includes a channel wall protruding from the lower surface substrate toward the through-hole, and a specimen solution is introduced into a lower surface side space to introduce the specimen into the through-hole.

9 Claims, 16 Drawing Sheets

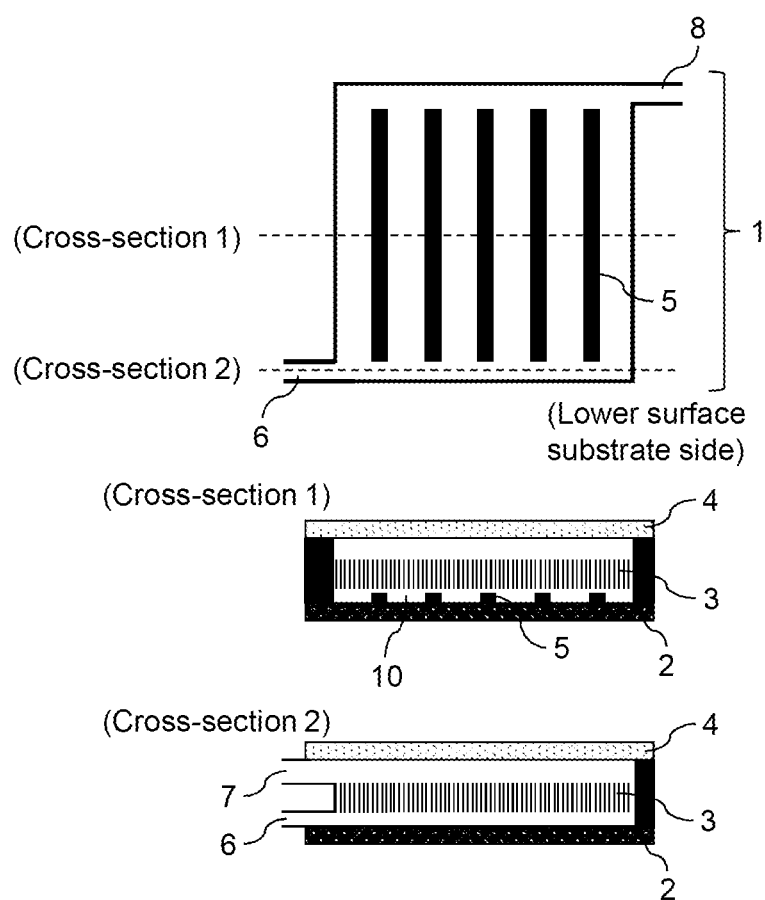

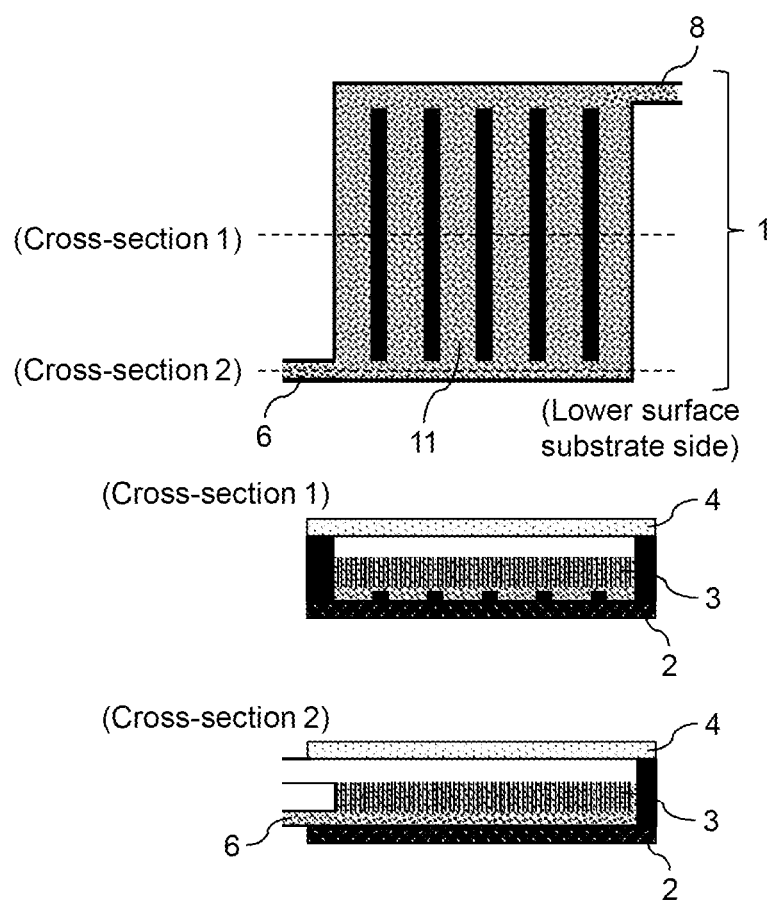

MEASUREMENT CELL MANUFACTURING METHOD AND MEASUREMENT CELL

TECHNICAL FIELD

The present disclosure relates to a measurement cell manufacturing method.

BACKGROUND ART

At present, a digital polymerase chain reaction (PCR) method capable of detecting a mutant gene with high sensitivity has attracted attention. In the digital PCR method, first of all, a plurality of genes contained in a specimen are respectively isolated into a plurality of micro-wells, and each well is labeled according to the type of isolated gene. Thereafter, the number of wells is counted based on the label information, thereby quantifying the number of specific types of genes in the specimen. Only a very small amount of genes is present in the blood of a cancer patient assumed as an example of a measurement target. Accordingly, in actual measurement, a measurement sample is prepared using a trace specimen obtained by dissolving genes extracted from the blood in a trace solution (about 20 il). Therefore, in order to measure as many genes as possible, it is necessary to efficiently distribute trace specimens to wells to increase the specimen utilization ratio. When trace specimens in which genes are dissolved are distributed to wells, it is necessary to handle the trace specimens in a closed system as much as possible to prevent contamination of the trace specimens. Therefore, it is desirable to arrange the wells in the closed system and distribute the trace specimens to the wells using a channel.

PTL 1 discloses a technique of distributing a specimen to wells arranged with their holes being exposed to the surface by installing a space (well chamber) including the wells in a channel of the specimen and by bringing the specimen into contact with the holes in the surfaces of the wells within the well chamber. In this document, the total volume of the wells is relatively small with respect to the total volume of the well chamber. In the embodiment described in the same literature, the specimen utilization ratio (the total volume of the wells with respect to the total volume of the well chamber) is considered to be about 20%. The numerical values used for the calculation are as follows: volume of entire chamber: 25 µl, well diameter: 150 µm, well depth: 250 µm, and number of wells: maximum value (1000) described in "Description of Embodiments"

CITATION LIST

Patent Literature

PTL 1: JP 2015-532094 A

SUMMARY OF INVENTION

Technical Problem

The present inventors are researching a digital PCR method for quantifying genes of a specific sequence by counting the number of genes isolated into through-holes arranged in a plane. In order to improve the specimen utilization ratio, the inventors have reduced the distance between the wall surface of the well chamber and the surface where the holes of the wells are exposed, assuming the method of installing the well chamber in the channel of the specimen and distributing the specimen to the wells as disclosed in PTL 1. As a result, the channel of the specimen is narrowed, and the interfacial tension between the wall surface of the well chamber and the specimen has a large influence on the flowability of the specimen, thus making it difficult to spread the specimen in the plane where the holes of the wells are exposed. Therefore, the number of holes on the well surface in contact with the specimen decreased, and the specimen utilization ratio decreased unexpectedly (about 20%). However, when digital PCR measurement is applied to the blood of a cancer patient, which is assumed as an example of a measurement target, the specimen utilization ratio is preferably 60% or more.

The present disclosure has been made in view of such a situation, and an object of the present disclosure is to provide a technique capable of manufacturing a measurement cell having a high specimen utilization ratio in the case of using a measurement cell that introduces a specimen into a surface hole.

Solution to Problem

In the measurement cell manufacturing method according to the present disclosure, a measurement cell includes a channel wall protruding from a lower surface substrate toward a through-hole, and a specimen solution is introduced into a lower surface side space to introduce the specimen into the through-hole.

Advantageous Effects of Invention

According to the present disclosure, the specimen channel formed by the channel wall guides the specimen solution from an inlet toward an outlet, so that the specimen solution can be spread throughout the through-hole chip. Therefore, the specimen utilization ratio in the measurement cell can be improved.

Further features related to the present disclosure will become apparent from the description of the present specification and the accompanying drawings. Aspects of the present disclosure are achieved and implemented by combinations of elements and the following detailed description and the appended claims. It is to be understood that the description herein is exemplary only and is not intended to limit the claims or applications in any way.

BRIEF DESCRIPTION OF DRAWINGS

FIG. 2 is an example of the structure of a measurement cell 1 according to Examples 1 to 5.

FIG. 3 is a schematic view of the measurement cell 1 after the injection of a specimen 11.

DESCRIPTION OF EMBODIMENTS

Figure 1A:
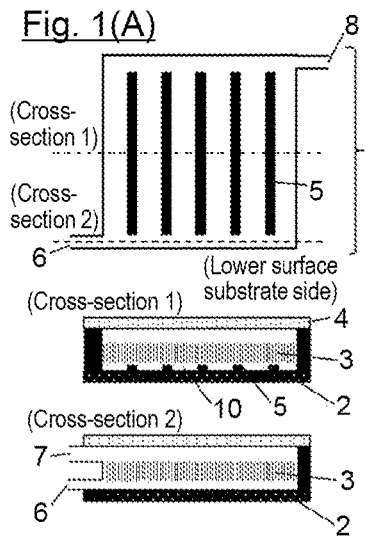
FIG. 1 is a view schematically illustrating a measurement cell manufacturing method.

The present embodiment relates to a biomolecule measurement method, particularly a measurement cell manufacturing method related to a method for measuring a genetic mutation. The present embodiment discloses a measurement cell preparing method for improving the specimen utilization ratio of a measurement cell.

Hereinafter, the present embodiment will be described with reference to the accompanying drawings. In the accompanying drawings, functionally same elements may be denoted by the same reference numerals, and a redundant description will be omitted. Note that, although the accompanying drawings illustrate specific embodiments and examples conforming to the principles of the present disclosure, these are for understanding the present disclosure and are not used to interpret the present disclosure in a limited manner.

The present embodiment has made a sufficiently detailed description for allowing those skilled in the art to implement the present disclosure. However, it is necessary to understand that other implementations and embodiments are possible, and changes in configuration and structure and replacement of various elements are possible without departing from the scope and spirit of the technical idea of the present disclosure. Therefore, the following description should not be interpreted as being limited thereto.

FIG. 1 is a view schematically illustrating a measurement cell manufacturing method according to the present disclosure. FIG. 1(A) shows a state of a measurement cell 1 before the introduction of a specimen and oil. FIG. 1(A) includes a view of the measurement cell 1 as viewed from a lower surface substrate 2 side (upper part of FIG. 1A), a cross-sectional view at a cross section 1 (middle part of FIG. 1A), and a cross-sectional view at a cross section 2 (lower part of FIG. 1A). The measurement cell 1 includes a lower surface substrate 2, a through-hole chip 3, an upper surface substrate 4, a channel wall 5, a solution inlet 6 to the lower surface substrate side, a solution inlet 7 to the upper surface substrate side, a solution outlet 8 from the lower surface substrate side, and a solution outlet 9 from the upper surface substrate side.

In the upper view of FIG. 1A, for convenience of explanation, the channel wall 5 is formed in a space (lower surface side space) between the lower surface substrate 2 and the through-hole chip 3. The material and shape of the lower surface substrate 2 are not particularly limited as long as the lower surface substrate 2 can form, together with the through-hole chip 3 and the channel wall 5, a channel (a channel 10 on the lower surface substrate side) of the solution introduced from the solution inlet 6. A resin, metal, glass, silicon, or the like may be used as a material for forming the lower surface substrate 2.

The through-hole chip 3 is a chip (plate-like member) having a plurality of through-holes arranged in a planar shape. The size (plane size) of the through-hole chip 3 can be set according to the size of an observation region when the number of genes isolated to the through-holes is counted. In the case of observation using a microscope, the length of one side of the through-hole chip 3 can be set in the range of 0.1 cm to 5 cm. The through-hole of the through-hole chip 3 preferably has a functionality of holding the specimen 11 introduced from the solution inlet 6 and can have any shape such as a cylinder or a hexagonal column. This through-hole may have a tapered shape. The diameter of the through-hole is preferably 10 μm to 100 μm. When the diameter of the through-hole is 10 μm or less, it is difficult to count the number of wells (through-holes) labeled with fluorescence or the like at the time of digital PCR measurement, which is not preferable. When the diameter of the through-hole is 100 μm or more, a force (capillary force) with which the through-hole sucks up the specimen flowing through the channel 10 on the lower surface substrate side becomes weak, which is not preferable. The thickness of the through-hole chip 3 is preferably 50 μm to 500 μm. If the thickness of the through-hole chip 3 is less than 50 μm, the through-hole chip 3 lacks mechanical stability, so that the chip may be damaged. When the film thickness of the through-hole chip 3 is 500 μm or more, the amount of specimen required for measurement becomes excessively large, which is not preferable. The number of through-holes of the through-hole chip 3 can be arbitrarily set in a range of, for example, 10 to 100000 depending on the application. As a material for the through-hole chip 3, a resin, metal, glass, silicon wafer, or the like may be used. In digital PCR measurement, when the number of wells (the number of through-holes) is counted based on fluorescent labeling, it is preferable to use a material having weak autofluorescence as a material for the through-hole chip 3. The through-hole can be formed by a laser irradiation method, a liquid phase method, an imprinting method, or the like. By making the inner wall surface of the through-hole hydrophilic, the force (capillary force) for sucking up the specimen from the channel 10 on the lower surface substrate side can be increased, and the held state of the specimen 11 sucked up into the through-hole can be stabilized. The distance between the lower surface substrate 2 and the through-hole chip 3 is preferably 30 μm to 150 μm. If the distance between the lower surface substrate 2 and the through-hole chip 3 is smaller than 30 μm, the channel resistance of the channel 10 on the lower surface substrate side increases, and it becomes difficult to inject the specimen 11, which is not preferable. It is not preferable that the distance between the lower surface substrate 2 and the through-hole chip 3 is larger than 150 μm because the specimen utilization ratio decreases.

The shape and material of the upper surface substrate 4 are not particularly limited as long as a channel of the solution introduced from the solution inlet 7 to the upper surface substrate side can be formed together with the through-hole chip 3 and a well (through-hole) labeled with fluorescence or the like can be observed from the outside of the measurement cell. As a material for the upper surface substrate 4, a resin, glass, or the like can be considered. When the well (through-hole) labeled with fluorescence or the like is optically observed, the upper surface substrate 4 is preferably transparent. The term "transparent" used in the present specification means that the transmittance of light at the wavelength of observation light is, for example, 70% or more.

The shape of the channel wall 5 is not limited as long as a channel (the channel 10 on the lower surface substrate side) of the solution introduced from the solution inlet 6 to the lower surface substrate side can be formed together with the lower surface substrate 2 and the through-hole chip 3, and also as long as the solution introduced from the solution inlet 6 to the lower surface substrate side can be uniformly spread in a space (lower surface side space) formed between the lower surface substrate 2 and the through-hole chip 3. As an example of the layout of the channel wall 5, a structure in which a plurality of trench-shaped paths extend linearly as illustrated in FIG. 1(A), a layout in which the solution inlet 6 and the solution outlet 8 can be connected by one stroke as described later, and the like are possible. The cross-sectional shape of the channel wall 5 may be a rectangular (square) square, triangle, semicircle, ellipse, or the like. The upper surface (or lower surface) of the channel wall 5 does not need to be in contact with the through-hole chip 3 (or the lower surface substrate 2) as long as the solution introduced from the solution inlet 6 can be uniformly spread in the space formed between the lower surface substrate 2 and the through-hole chip 3. As a material for forming the channel wall 5, a resin, metal, glass, silicon, or the like may be used.

The shapes of the solution inlet 6 to the lower surface substrate side and of the solution inlet 7 to the upper surface substrate side are not particularly limited as long as a specimen or oil (described later) can be introduced from the outside. The shapes of the solution outlet 8 from the lower surface substrate side and of the solution outlet 9 from the upper surface substrate side are not particularly limited as long as a specimen or oil can be discharged to the outside.

Figure 1B:
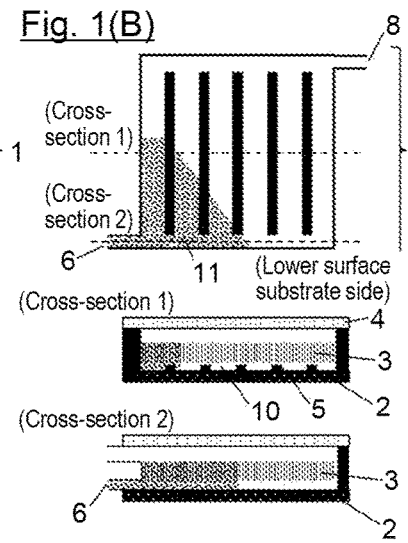

FIG. 1(B) shows a state in the middle of introducing a specimen 11 into the measurement cell 1. As the specimen 11, a specimen to be examined by normal bioanalysis can be used. Examples of the specimen 11 include a cell solution, a gene solution, a bacterial solution, and an antibody solution. The specimen 11 may contain a molecule to be subjected to a reaction for amplifying a gene, a molecule capable of visualizing the type of molecule present in the specimen, a molecule for stabilizing/activating a cell, and the like. Specific examples of these molecules include PCR reagents, fluorescent probes, and cell culture substances. The specimen 11 is introduced from the solution inlet 6 to the lower surface substrate side using a pump capable of transferring a small amount of solution. Examples of a pump capable of transferring a small amount of solution include a syringe pump.

The specimen 11 introduced from the solution inlet 6 to the lower surface substrate side is spread in the in-plane direction by the channel formed by the lower surface substrate 2/the through-hole chip 3/the channel wall 5, and is uniformly introduced into the space formed between the lower surface substrate 2 and the through-hole chip 3. Part of the introduced specimen 11 is introduced into the through-hole of the through-hole chip 3 by capillary force.

Figure 1C:
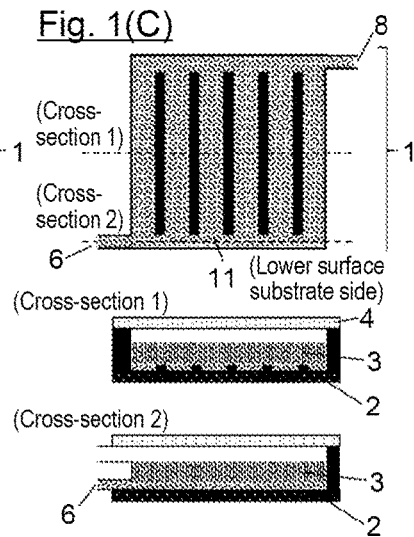

FIG. 1(C) shows a state of the measurement cell 1 after the specimen 11 is introduced into the measurement cell 1. When the specimen 11 is introduced from the solution inlet 6 to the lower surface substrate side, the specimen 11 is introduced into the space formed between the lower surface substrate 2 and the through-hole chip 3 and also into the through-hole of the through-hole chip 3. The specimen 11 excessively introduced into the measurement cell 1 is discharged from the solution outlet 8 from the lower surface substrate side.

Figure 1D:
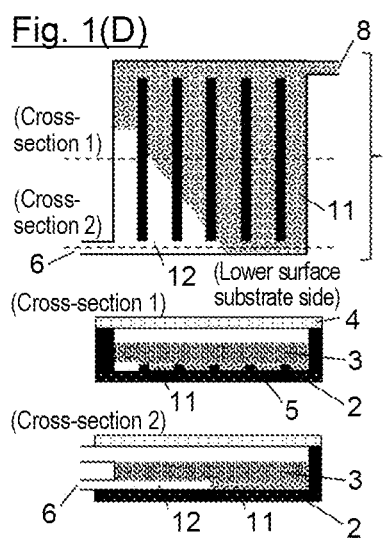

FIG. 1(D) illustrates a state in which the air 12 is fed from the solution inlet 6 to the lower surface substrate side and the specimen 11 introduced into the space formed between the lower surface substrate 2 and the through-hole chip 3 is in the process of being discharged to the outside. The air 12 is introduced into the solution inlet 6 to the lower surface substrate side by using a pump capable of transferring a small amount of air. Examples of the pump capable of transferring the small amount of air include a syringe pump.

The air 12 introduced from the solution inlet 6 to the lower surface substrate side is spread in the in-plane direction by the channel formed by the lower surface substrate 2/through-hole chip 3/channel wall 5, and is uniformly introduced into the space formed between the lower surface substrate 2 and the through-hole chip 3. At the same time, the specimen 11 is discharged from the solution outlet 8 from the lower surface substrate. The specimen 11 introduced into the through-hole of the through-hole chip 3 remains in the through-hole without being discharged from the through-hole because the interfacial tension acts on the interface between the specimen 11 and the side surface of the through-hole.

Figure 1E:
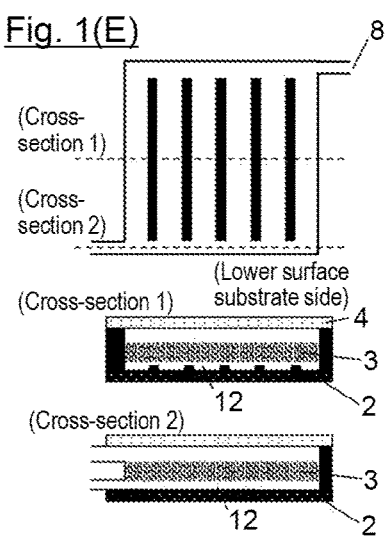

FIG. 1(E) illustrates a state after the air 12 is introduced into the measurement cell 1 into which the specimen 11 is introduced and the specimen 11 is discharged to the outside from the space formed between the lower surface substrate 2 and the through-hole chip 3. The space formed between the lower surface substrate 2 and the through-hole chip 3 is replaced with the introduced air 12. The excessively introduced air 12 is discharged from the solution outlet 8 from the lower surface substrate side.

Figure 1F:
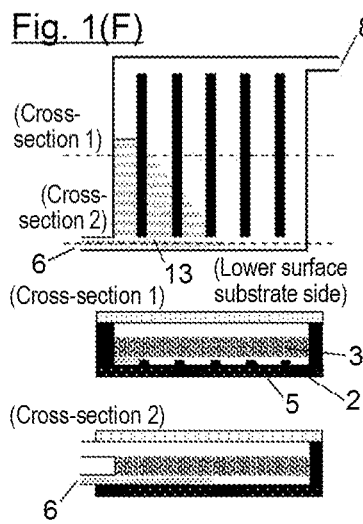

FIG. 1(F) shows a state in the middle of introducing the oil 13 from the solution inlet 6 to the lower surface substrate side. The oil 13 is introduced to suppress the drying of the specimen 11 introduced into the through-hole of the through-hole chip 3. In particular, when the specimen 11 introduced into the through-hole is a solution containing a gene, and when it is necessary to perform PCR amplification of the gene in the through-hole, in consideration of a temperature cycle necessary for PCR amplification, it is necessary to introduce oil that suppresses the evaporation of the specimen 11 into a space formed between the lower surface substrate 2 and the through-hole chip 3 and into a space (upper surface side space) formed between the upper surface substrate 4 and the through-hole chip 3. The type of the oil 13 is not particularly limited as long as the oil can be injected into the space formed between the lower surface substrate 2 and the through-hole chip 3 and into the space formed between the upper surface substrate 4 and the through-hole chip 3, and also as long as evaporation of the specimen 11 can be suppressed during PCR amplification (that is, the oil can act as a drying inhibitor on the specimen 11). Examples of the oil 13 include Novec (available from 3M), Fluorinert (available from 3M), and mineral oil. The oil 13 is introduced from the solution inlet 6 to the lower surface substrate side by using a pump capable of transferring a small amount of solution. Examples of a pump capable of transferring a small amount of solution include a syringe pump.

The oil 13 introduced from the solution inlet 6 to the lower surface substrate side is spread in the in-plane direction by the channel formed by the lower surface substrate 2/the through-hole chip 3/the channel wall 5, and is uniformly introduced into the space formed between the lower surface substrate 2 and the through-hole chip 3. The specimen 11 introduced into the through-hole of the through-hole chip 3 remains in the through-hole without being discharged from the through-hole because the interfacial tension acts on the interface between the specimen 11 and the side surface of the through-hole.

Figure 1G:
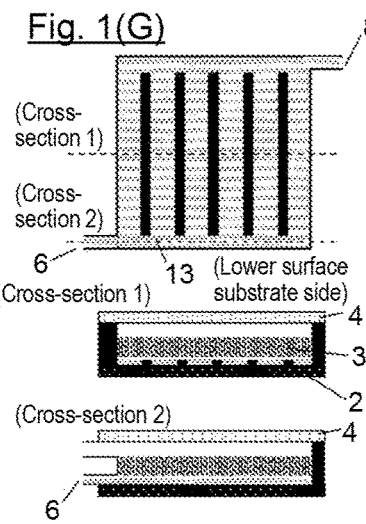

FIG. 1(G) shows a state of the measurement cell 1 after the oil 13 is introduced from the solution inlet 6 to the lower surface substrate side. When the oil 13 is introduced from the solution inlet 6 to the lower surface substrate side, the oil 13 is introduced into a space formed between the lower surface substrate 2 and the through-hole chip 3. The excessively introduced oil 13 is discharged from the solution outlet 8 from the lower surface substrate side.

Figure 1H:
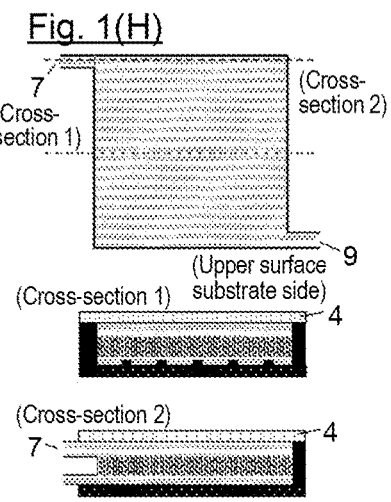

FIG. 1(H) shows a state of the measurement cell after the oil 13 is introduced from the solution inlet 7 to the upper surface substrate side. When the oil 13 is introduced from the solution inlet 7 to the upper surface substrate side, the oil 13 is introduced into the space formed between the upper surface substrate 4 and the through-hole chip 3. The specimen 11 introduced into the through-hole of the through-hole chip 3 remains in the through-hole without being discharged from the through-hole because the interfacial tension acts on the interface between the specimen 11 and the side surface of the through-hole. The excessively introduced oil 13 is discharged from the solution outlet 9 from the upper surface substrate side.

In the manufacturing method for the measurement cell 1 described above, the measurement cell 1 is manufactured by forming a plurality of channels 10 for guiding the flow of the specimen 11 from the solution inlet 6 toward the solution outlet 8 in the lower surface side space and by introducing the specimen 11 into the lower surface side space. Since the specimen 11 is uniformly diffused in the in-plane direction in the lower surface side space by the functionality of the channel 10, the specimen 11 uniformly spreads over all the through-holes. Therefore, the measurement cell 1 having a high specimen utilization ratio can be manufactured.

The specimen 11 is introduced in a direction not parallel to the direction in which the through-hole extends (the orthogonal direction in FIG. 1). This is because of the following reason. Unlike FIG. 1, it is also conceivable to introduce the specimen 11 in parallel with the direction in which the through-hole extends. However, in this case, before the specimen 11 diffuses in the in-plane direction of the lower surface side space, the ratio at which the specimen 11 passes through the through-hole and comes out into the upper surface side space is relatively large. Therefore, it is difficult to spread the specimen 11 to all the through-holes. By introducing the specimen 11 in a direction not parallel to the extending direction of the through-hole, the specimen 11 can be diffused in the in-plane direction of the lower surface side space earlier before the specimen 11 passes through the through-hole.

The solution inlet 6 and the solution outlet 8 are disposed diagonally to each other on the lower surface substrate 2. As compared with a case in which the solution inlet 6 and the solution outlet 8 are disposed at both ends on the same side of the lower surface substrate 2, more time is required in the former case until the specimen 11 is discharged after it is introduced into the lower surface side space. Accordingly, the specimen 11 can be more uniformly diffused in the lower surface side space. However, it is not always necessary to dispose the solution inlet 6 and the solution outlet 8 diagonally in a one-stroke channel (to be described later).

Examples 1 to 5

FIG. 2 shows an example of the structure of a measurement cell 1 according to Examples 1 to 5 of the present disclosure. In Examples 1 to 5, as shown in FIG. 1, a channel having a plurality of straight trench-shaped portions is disposed as the channel 10. The measurement cell 1 was prepared by combining (a) a channel component group (a component group including a lower surface substrate 2, a channel wall 5, a solution inlet 6 to the lower surface substrate side, a solution inlet 7 to the upper surface substrate side, a solution outlet 8 from the lower surface substrate side, and a solution outlet 9 from the upper surface substrate side) prepared by a 3D printer (Agilista-3200 (available from Keyence Corporation), (b) a through-hole chip 3 (length: 10 mm, width: 10 mm, thickness: 300 µm, diameter of through-hole: 60 µm, and pitch: 75 µm) prepared by a semiconductor process, and (c) an upper surface substrate 4 prepared using acrylic glass having a visible light transmittance of 92%. As the specimen 11, an aqueous solution was used which was obtained by mixing a predetermined amount of genomic DNA (wild type), a master mix (QuantStudio 3D Digital PCR Master Mix), and a primer/probe mix (TaqMan Assay (for KRAS gene)). Novec 7500 (available from 3M) was used as an oil 13. The width of the channel wall was set to 240 µm, and the channel width was set to 600 µm. The distance between the through-hole chip 3 and the upper surface substrate 4 was set to 800 µm.

FIG. 3 is a schematic view of the measurement cell 1 after the injection of the specimen 11. A syringe pump was connected to the solution inlet 6 to the lower surface substrate side, and the specimen 11 was injected at a flow velocity of 50 µm/min. When the specimen 11 was introduced from the solution inlet 6, the specimen 11 was introduced into the space formed between the lower surface substrate 2 and the through-hole chip 3 and into the through-hole of the through-hole chip 3. The specimen 11 excessively introduced into the measurement cell 1 was discharged from the solution outlet 8 from the lower surface substrate side.

Figure 4:
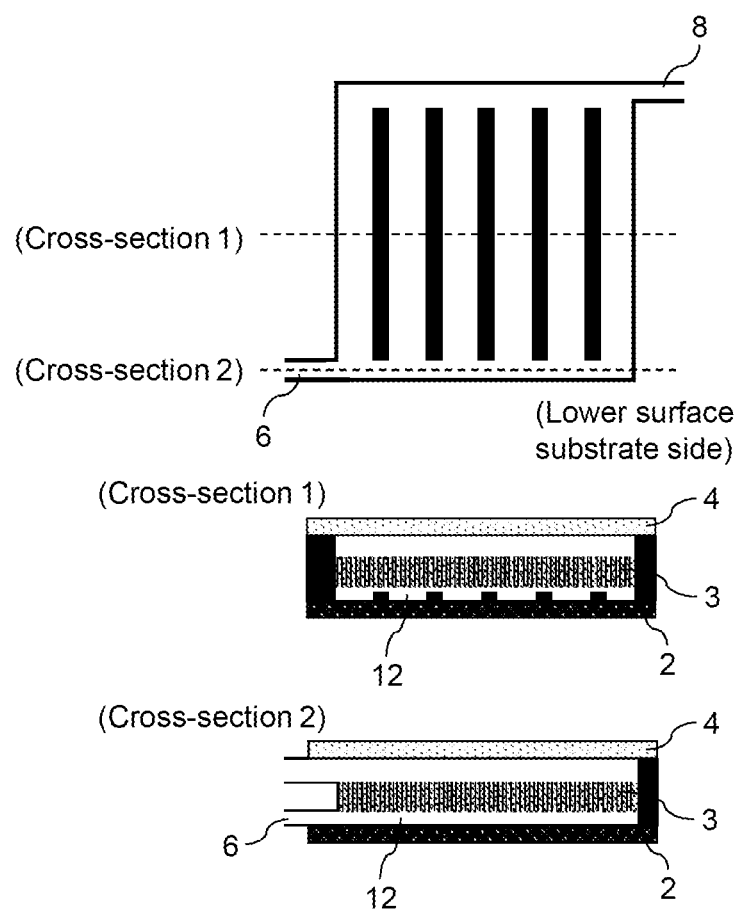
FIG. 4 is a schematic view of the measurement cell 1 after the injection of air 12.

FIG. 4 is a schematic view of the measurement cell 1 after the injection of air 12. Following FIG. 3, a syringe pump was connected to the solution inlet 6 to the lower surface substrate side, and the air 12 was injected for 5 minutes at a flow velocity of 100 µm/min. The space formed between the lower surface substrate 2 and the through-hole chip 3 was replaced with the introduced air 12, but the specimen 11 introduced into the through-hole of the through-hole chip 3 was left in the through-hole due to the interfacial tension acting on the interface between the specimen 11 and the through-hole side surface. The excessively introduced air 12 was discharged from the solution outlet 8 from the lower surface substrate side.

Figure 5:
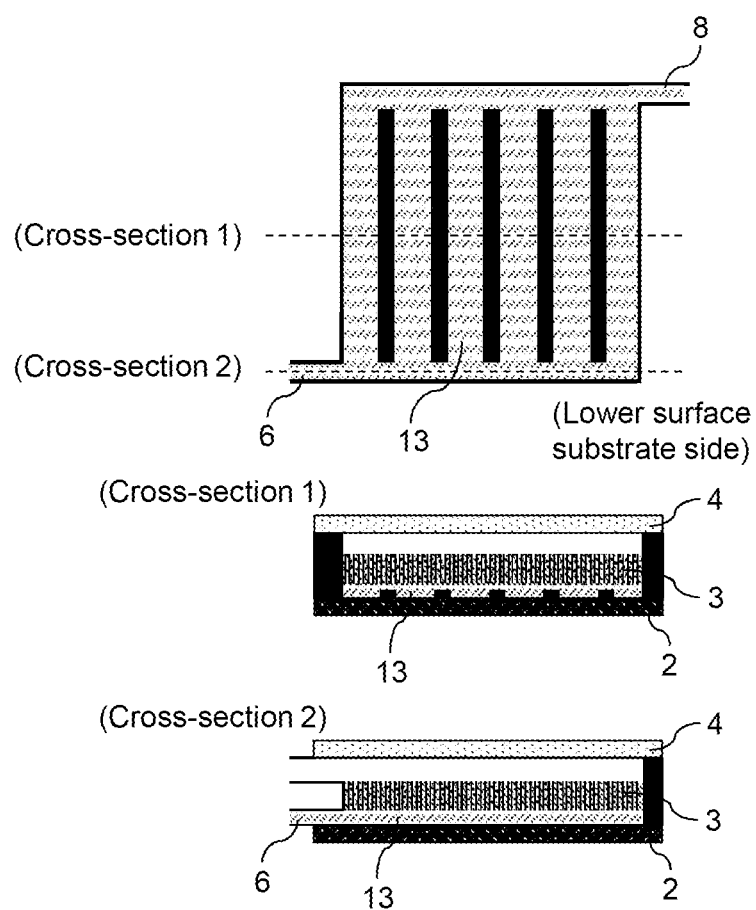
FIG. 5 is a schematic view of the measurement cell 1 after the injection of oil 13.

FIG. 5 is a schematic view of the measurement cell 1 after an oil 13 is injected. Following FIG. 4, a syringe pump was connected to the solution inlet 6 to the lower surface substrate side, and the oil 13 was injected at a flow velocity of 50 µm/min. When the oil 13 was introduced from the solution inlet 6 to the lower surface substrate side, the oil 13 was introduced into a space formed between the lower surface substrate 2 and the through-hole chip 3. The specimen 11 introduced into the through-hole of the through-hole chip 3 remained in the through-hole without being discharged from the through-hole because the interfacial tension acted on the interface between the specimen 11 and the side surface of the through-hole. The excessively introduced oil 13 was discharged from the solution outlet 8 from the lower surface substrate side.

Figure 6:
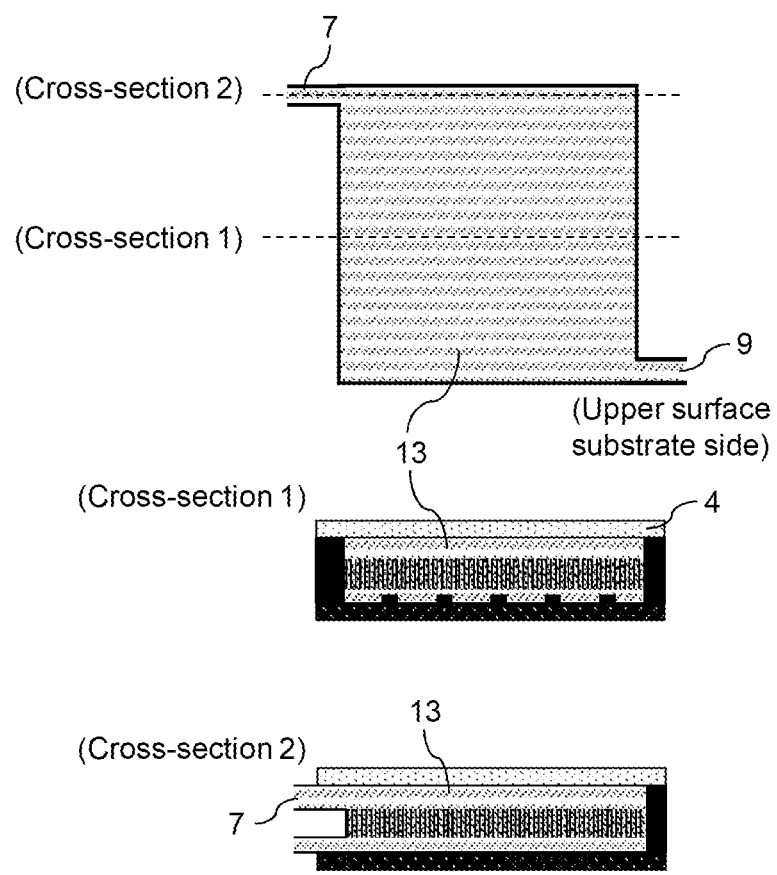
FIG. 6 is a schematic view of the measurement cell 1 after the injection of the oil 13.

FIG. 6 is a schematic view of the measurement cell 1 after the oil 13 is injected. Following FIG. 5, a syringe pump was connected to the solution inlet 7 to the upper surface substrate side, and the oil 13 was injected at a flow velocity of 50 μm/min. When the oil 13 was introduced from the solution inlet 7 to the upper surface substrate side, the oil 13 was introduced into the space formed between the upper surface substrate 4 and the through-hole chip 3. The specimen 11 introduced into the through-hole of the through-hole chip 3 remained in the through-hole without being discharged from the through-hole because the interfacial tension acted on the interface between the specimen 11 and the side surface of the through-hole. The excessively introduced oil 13 was discharged from the solution outlet 9 from the upper surface substrate side.

Example 6

Figure 7:
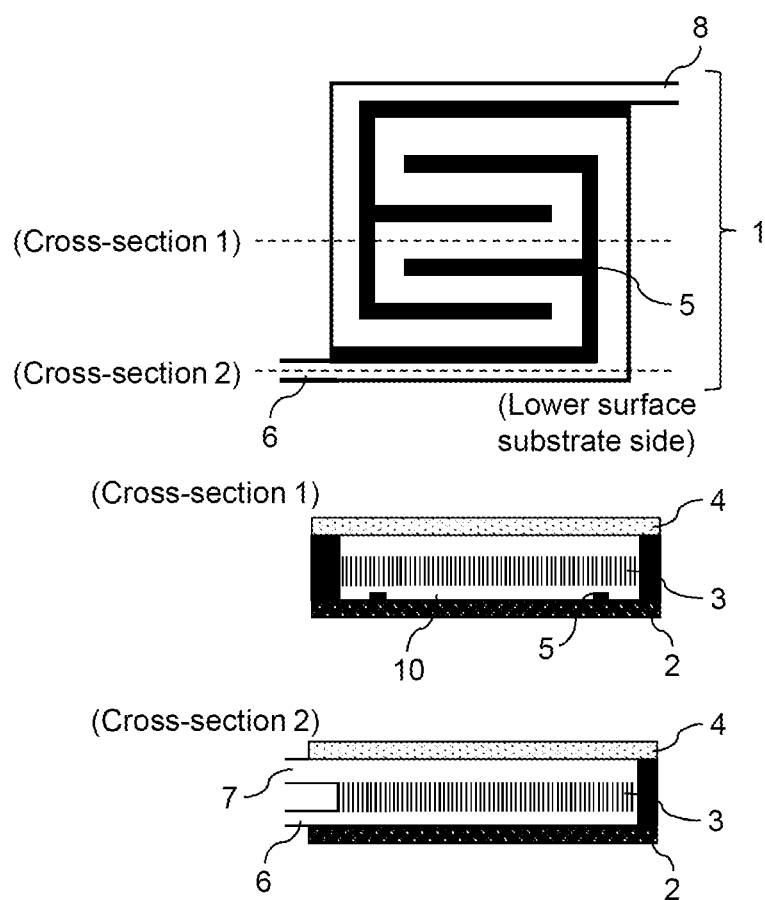
FIG. 7 is an example of the structure of a measurement cell 1 according to Example 6.

FIG. 7 shows an example of the structure of a measurement cell 1 according to Example 6 of the present disclosure. In Example 6, a solution inlet 6 to the lower surface substrate and the solution outlet 8 to the lower surface substrate were arranged so as to be connected via one channel 10 (that is, the channel 10 was not branched in the middle), and the measurement cell 1 was prepared by the same method as in Examples 1 to 5.

Figure 8:
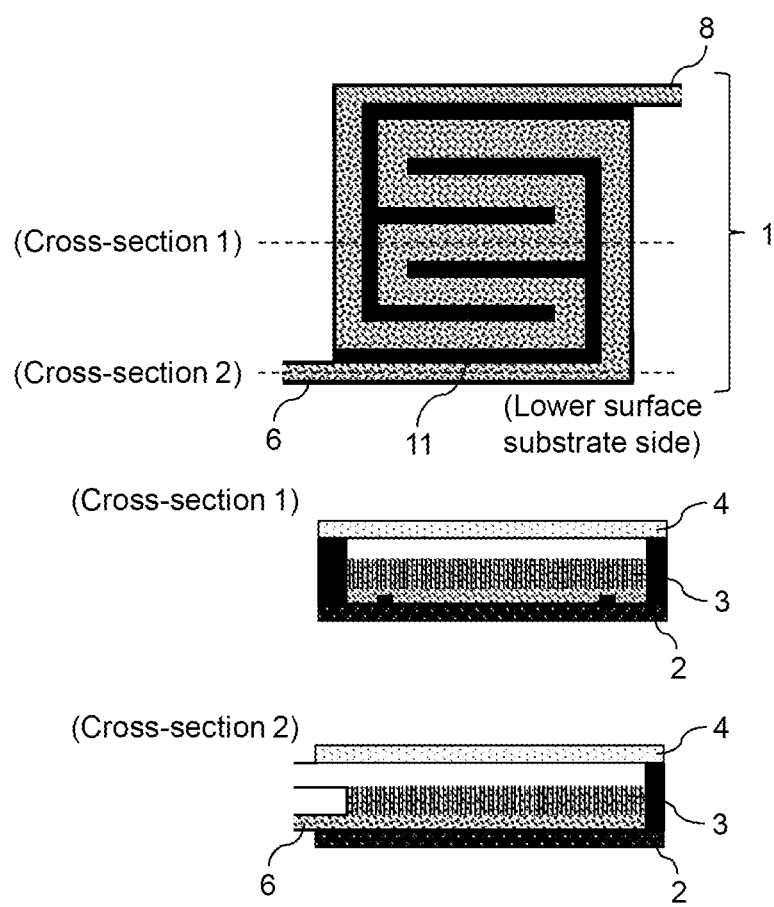
FIG. 8 is a schematic view of the measurement cell 1 after the injection of a specimen 11.

FIG. 8 is a schematic view of the measurement cell 1 after the injection of a specimen 11. A syringe pump was connected to the solution inlet 6 to the lower surface substrate side, and the specimen 11 was injected at a flow velocity of 50 μm/min. When the specimen 11 was introduced from the solution inlet 6 to the lower surface substrate side, the specimen 11 was introduced into the space formed between the lower surface substrate 2 and into the through-hole chip 3 and the through-hole of the through-hole chip 3. The specimen 11 excessively introduced into the measurement cell 1 was discharged from the solution outlet 8 from the lower surface substrate side.

Figure 9:
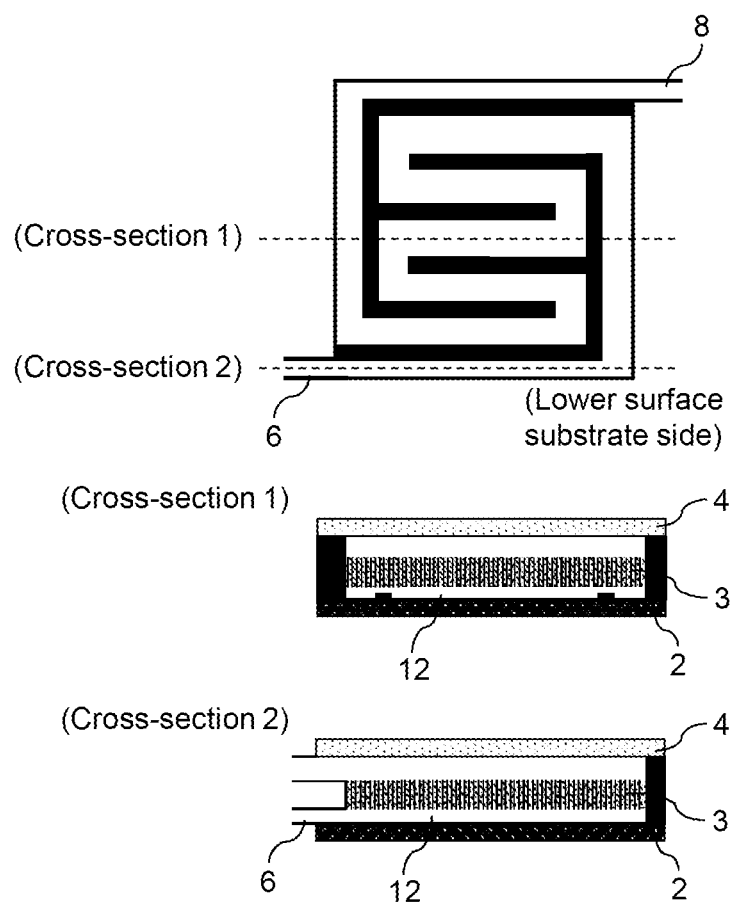
FIG. 9 is a schematic view of the measurement cell 1 after the injection of air 12.

FIG. 9 is a schematic diagram of the measurement cell 1 after the injection of air 12. Following FIG. 8, a syringe pump was connected to the solution inlet 6 to the lower surface substrate side, and the air 12 was injected for 5 minutes at a flow velocity of 100 μm/min. The space formed between the lower surface substrate 2 and the through-hole chip 3 was replaced with the introduced air 12, but the specimen 11 introduced into the through-hole of the through-hole chip 3 was left in the through-hole due to the interfacial tension acting on the interface between the specimen 11 and the through-hole side surface. The excessively introduced air 12 was discharged from the solution outlet 8 from the lower surface substrate side.

Figure 10:
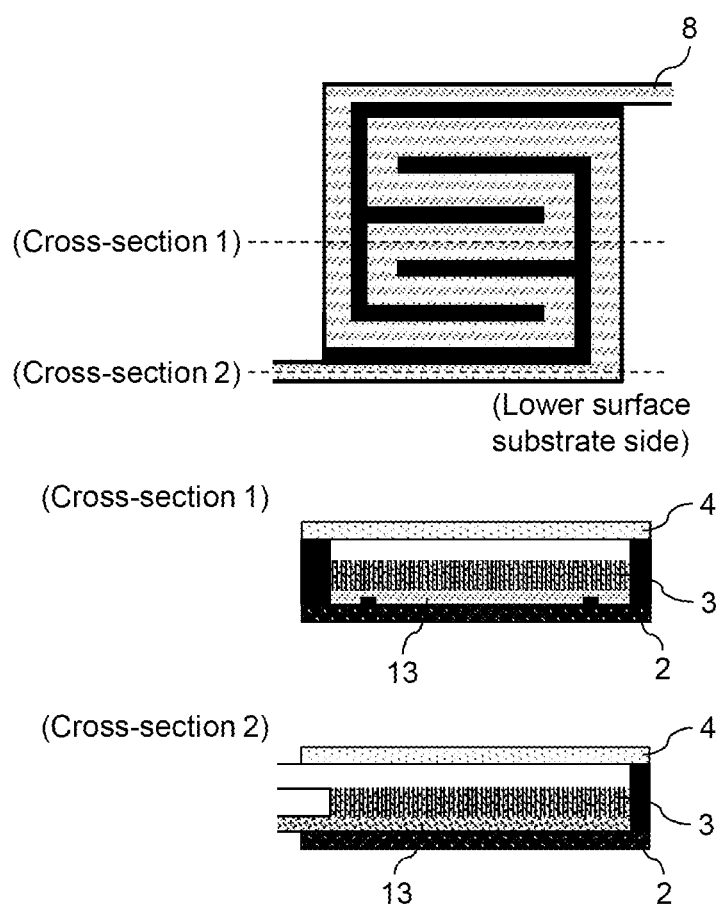
FIG. 10 is a schematic view of the measurement cell 1 after the injection of oil 13.

FIG. 10 is a schematic view of the measurement cell 1 after the injection of oil 13. Following FIG. 9, a syringe pump was connected to the solution inlet 6 to the lower surface substrate side, and the oil 13 was injected at a flow velocity of 50 μm/min. When the oil 13 was introduced from the solution inlet 6 to the lower surface substrate side, the oil 13 was introduced into a space formed between the lower surface substrate 2 and the through-hole chip 3. The specimen 11 introduced into the through-hole of the through-hole chip 3 remained in the through-hole without being discharged from the through-hole because the interfacial tension acted on the interface between the specimen 11 and the side surface of the through-hole. The excessively introduced oil 13 was discharged from the solution outlet 8 from the lower surface substrate side.

Figure 11:
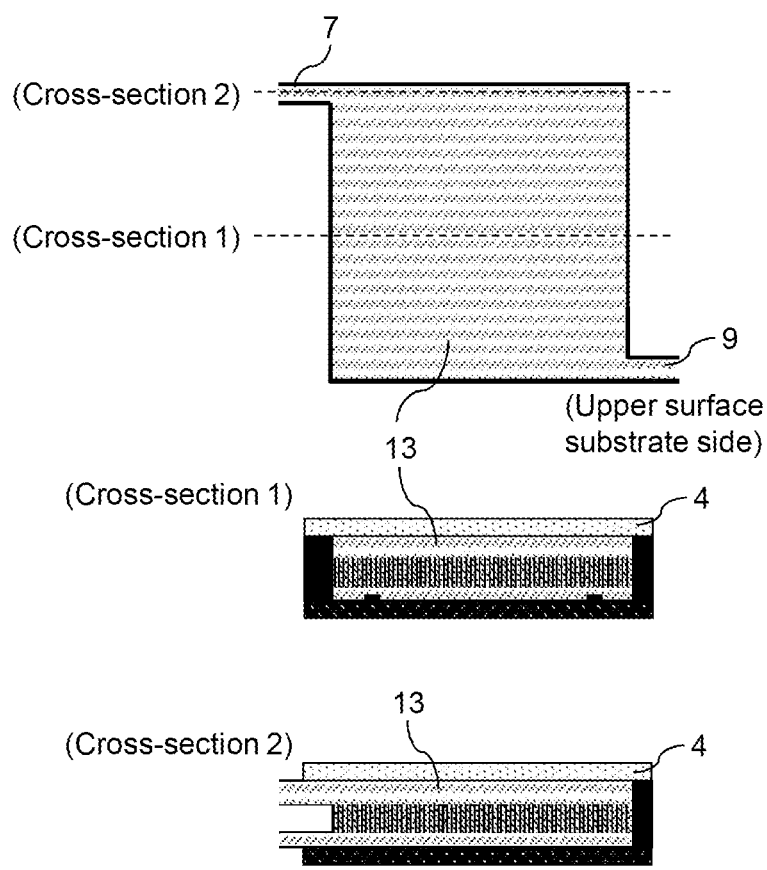
FIG. 11 is a schematic view of the measurement cell 1 after the injection of the oil 13.

FIG. 11 is a schematic view of the measurement cell 1 after the injection of oil 13. Following FIG. 10, a syringe pump was connected to a solution inlet 7 to the upper surface substrate side, and the oil 13 was injected at a flow velocity of 50 μm/min. When the oil 13 was introduced from the solution inlet 7 to the upper surface substrate side, the oil 13 was introduced into the space formed between the upper surface substrate 4 and the through-hole chip 3. The specimen 11 introduced into the through-hole of the through-hole chip 3 remained in the through-hole without being discharged from the through-hole because the interfacial tension acted on the interface between the specimen 11 and the side surface of the through-hole. The excessively introduced oil 13 was discharged from the solution outlet 9 from the upper surface substrate side.

Comparative Example

Figure 12:
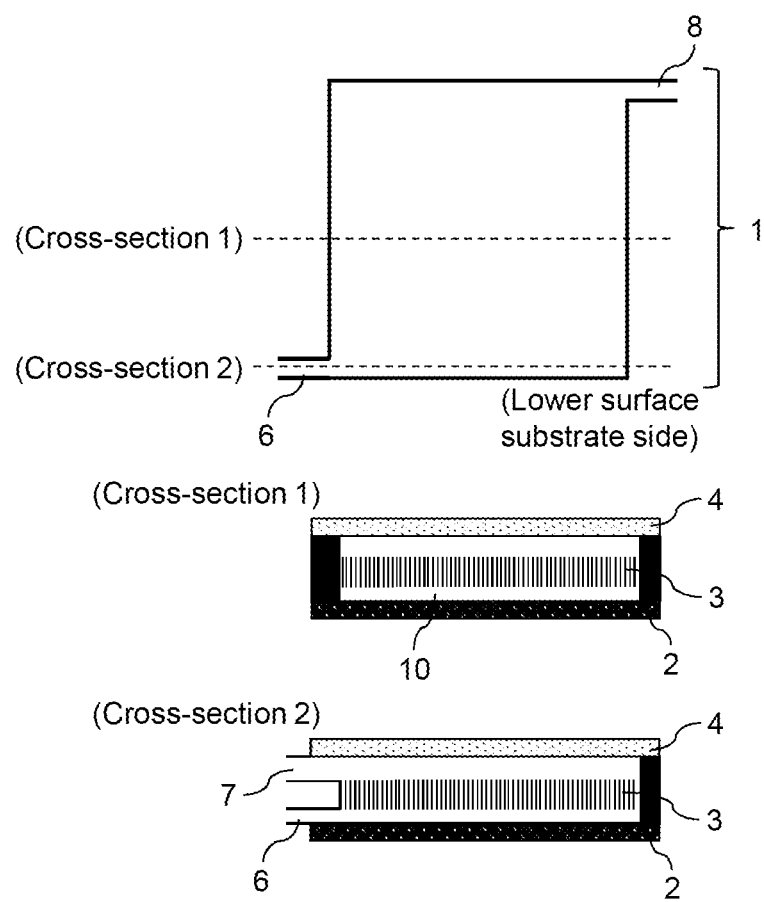
FIG. 12 is a schematic diagram of a measurement cell in a comparative example.

FIG. 12 is a schematic diagram of a measurement cell in a comparative example. In the comparative example, a measurement cell was prepared in the same manner as in Examples 1 to 6 without arranging the channel 10 for controlling the liquid flow in the space formed between the lower surface substrate 2 and the through-hole chip 3.

Figure 13:
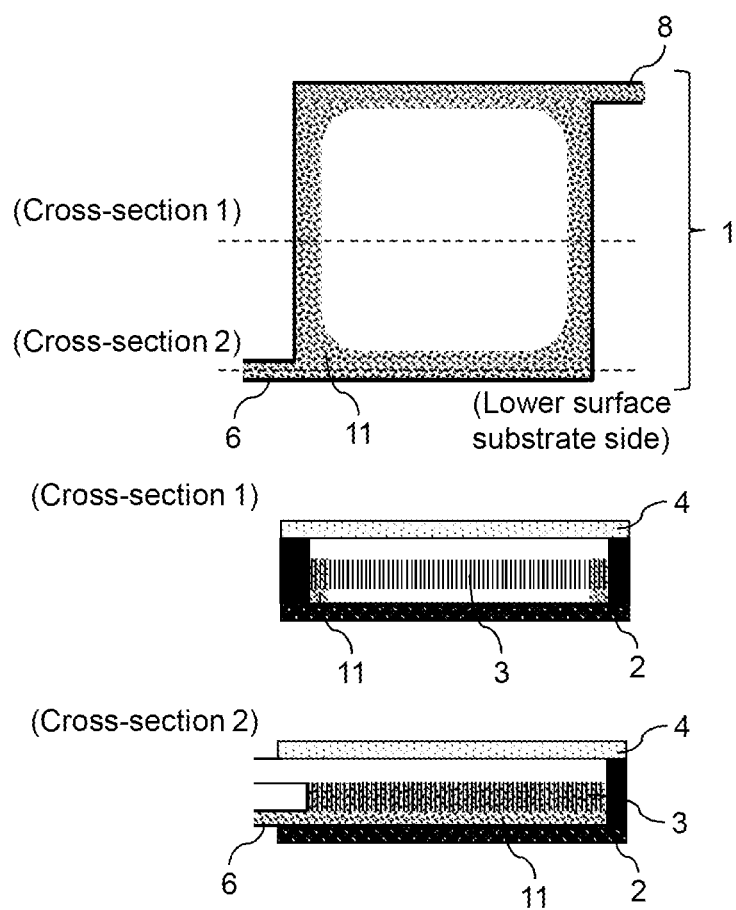
FIG. 13 is a schematic view of the measurement cell after the injection of a specimen.

FIG. 13 is a schematic diagram of a measurement cell after the injection of a specimen. A syringe pump was connected to the solution inlet 6 to the lower surface substrate side, and a specimen was injected at a flow velocity of 50 μm/min. When a specimen 11 was introduced from the solution inlet 6 to the lower surface substrate side, the specimen 11 was introduced along the wall surface where the interfacial tension acts strongly, but the specimen 11 was not introduced into the central region of the space formed between the lower surface substrate 2 and the through-hole chip 3. The specimen 11 was introduced into the through-hole on the upper surface of the region where the specimen 11 was introduced, but the specimen 11 was not introduced into the through-hole on the upper surface of the region where the specimen 11 was not introduced. The specimen 11 excessively introduced into the measurement cell 1 was discharged from the solution outlet 8 from the lower surface substrate side.

Figure 14:
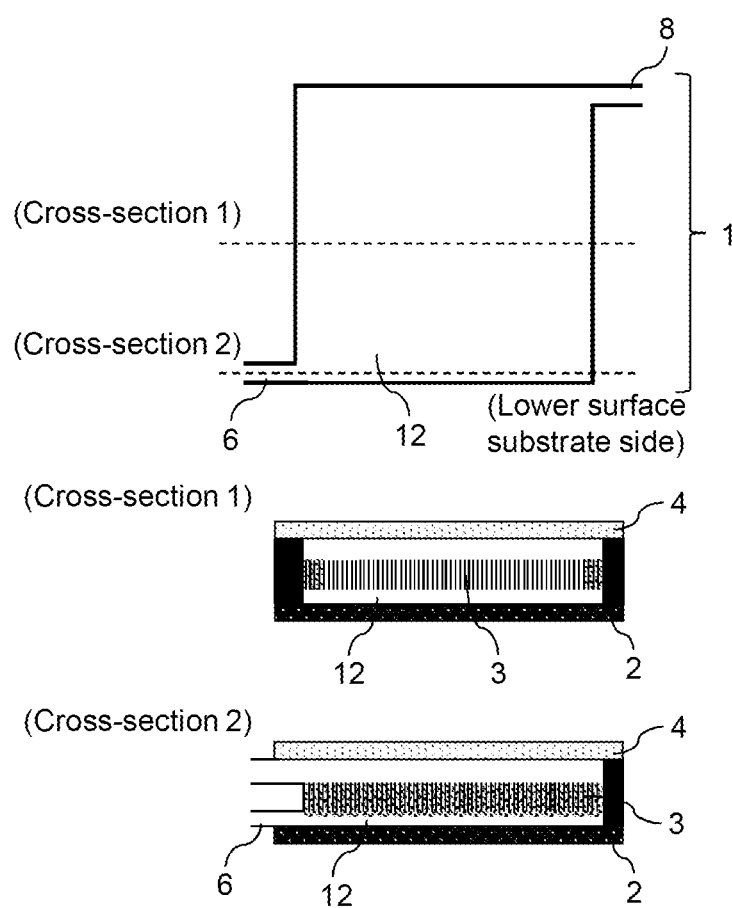
FIG. 14 is a schematic view of the measurement cell after the injection of air 12.

FIG. 14 is a schematic diagram of a measurement cell after the injection of air 12. Following FIG. 13, a syringe pump was connected to the solution inlet 6 to the lower surface substrate side, and the air 12 was injected for 5 minutes at a flow velocity of 100 μm/min. The space formed between the lower surface substrate 2 and the through-hole chip 3 was replaced with the introduced air 12, but the specimen 11 introduced into the through-hole of the through-hole chip 3 was left in the through-hole due to the interfacial tension acting on the interface between the specimen 11 and the through-hole side surface. The excessively introduced air 12 was discharged from the solution outlet 8 from the lower surface substrate side.

Figure 15:
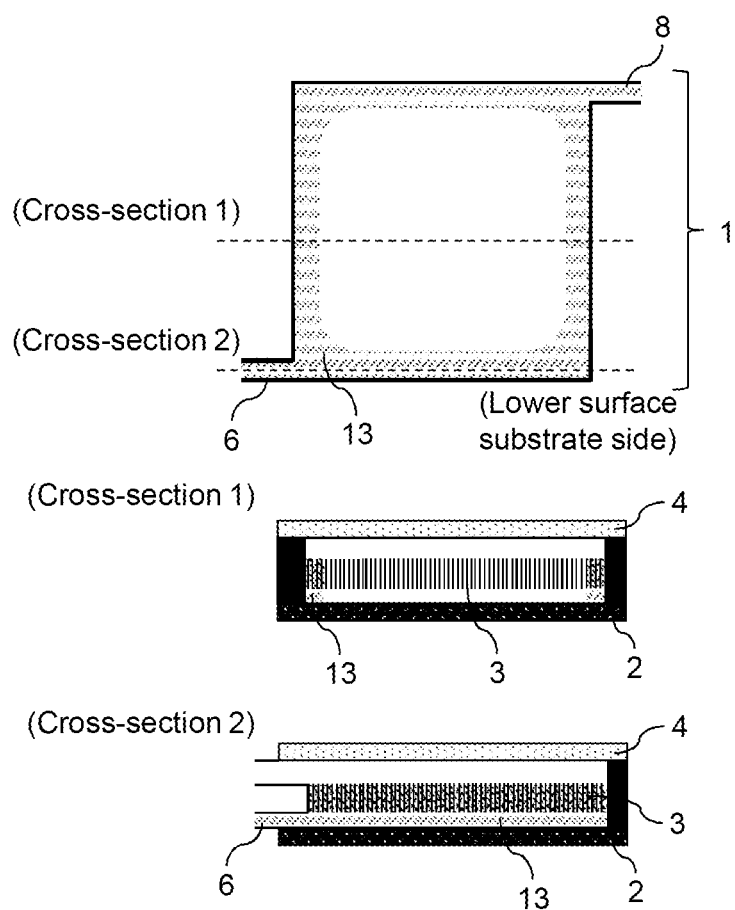
FIG. 15 is a schematic view of the measurement cell after the injection of oil 13.

FIG. 15 is a schematic view of a measurement cell after the injection of oil 13. Following FIG. 14, a syringe pump was connected to the solution inlet 6 to the lower surface substrate side, and the oil 13 was injected at a flow velocity of 50 μm/min. When the oil 13 was introduced from the solution inlet 6 to the lower surface substrate side, the oil 13 was introduced along the wall surface where the interfacial tension acts strongly, but the oil 13 was not introduced into the central region of the space formed between the lower surface substrate 2 and the through-hole chip 3. The specimen 11 introduced into the through-hole of the through-hole chip 3 remained in the through-hole without being discharged from the through-hole because the interfacial tension acted on the interface between the specimen 11 and the side surface of the through-hole. The excessively introduced oil 13 was discharged from the solution outlet 8 from the lower surface substrate side.

Figure 16:
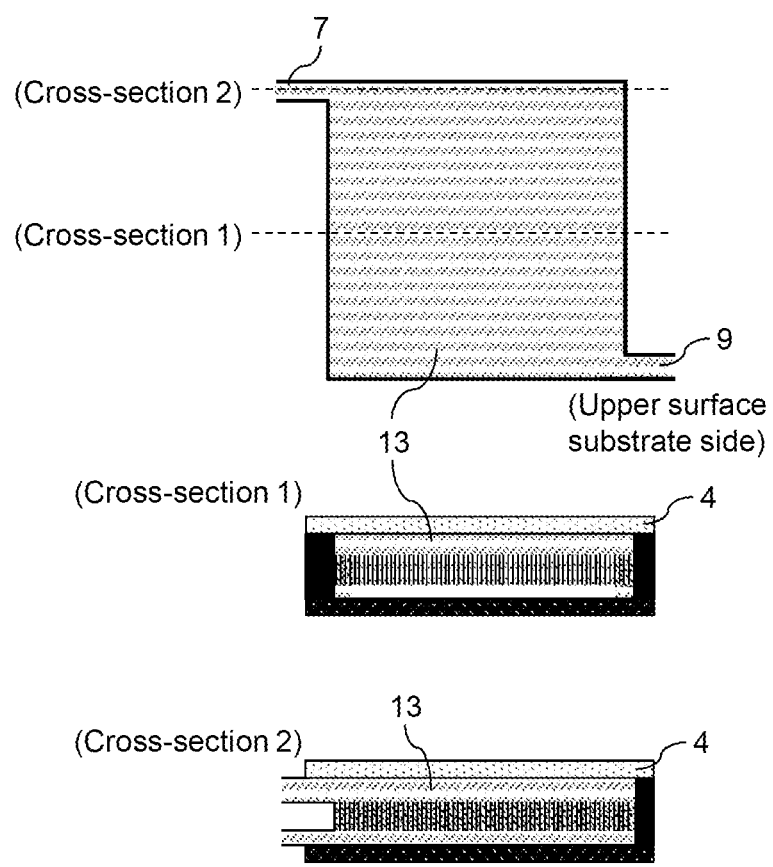
FIG. 16 is a schematic view of the measurement cell after the injection of the oil 13.

FIG. 16 is a schematic view of a measurement cell after the injection of oil 13. Following FIG. 15, a syringe pump was connected to a solution inlet 7 to the upper surface substrate side, and the oil 13 was injected at a flow velocity of 50 μm/min. When the oil 13 was introduced from the solution inlet 7 to the upper surface substrate side, the oil 13 was introduced into the space formed between an upper surface substrate 4 and the through-hole chip 3 and into the through-hole into which the specimen 11 was not introduced. The specimen 11 introduced into the through-hole of the through-hole chip 3 remained in the through-hole without being discharged from the through-hole because the interfacial tension acted on the interface between the specimen 11 and the side surface of the through-hole. The excessively introduced oil 13 was discharged from the solution outlet 9 from the upper surface substrate side. Unlike the case of the space formed between the lower surface substrate 2 and the through-hole chip 3, the oil 13 was uniformly introduced into the space formed between the upper surface substrate 4 and the through-hole chip 3. As a cause of this, it is considered that the distance (600 μm) between the upper surface substrate 4 and the through-hole chip 3 is larger than the distance (50 μm) between the lower surface substrate 2 and the through-hole chip 3, such that the influence of the interfacial tension between the wall surface and the oil 13 is small.

Table 1 shows the distance between the lower surface substrate 2 and the through-hole chip 3, the height of the channel wall 5, and the film thickness of the through-hole chip 3 in Examples 1 to 5. Table 1 also shows the specimen utilization ratio of the measurement cell in Examples 1 to 5. The specimen utilization ratio was calculated as the ratio of (volume b:the volume of the specimen 11 injected into the through-hole of the through-hole chip 3) to (volume a:the sum of the total volume of through-holes of through-hole chips 3 and the volume of the space formed between the lower surface substrate 2 and the through-hole chips 3) (that is, specimen utilization ratio=b/a). All the specimen utilization ratios of the measurement cells in Examples 1 to 5 were 60% or more, and it has been found that a measurement cell having a high specimen utilization ratio can be manufactured by the technology disclosed in the present specification.

Table 1 also shows the distance between the lower surface substrate 2 and the through-hole chip 3, the height of the channel wall 5, and the film thickness of the through-hole chip 3 in Example 6. Table 1 also shows the specimen utilization ratio of the measurement cell in Example 6. The specimen utilization ratio was calculated as the ratio of (volume b:the volume of the specimen 11 injected into the through-hole of the through-hole chip 3) to (volume a:the sum of the total volume of through-holes of through-hole chips 3 and the volume of the space formed between the lower surface substrate 2 and the through-hole chips 3). The specimen utilization ratio of the measurement cell in Example 6 was 60% or more, and it has been found that a measurement cell having a high specimen utilization ratio can be manufactured by the technology disclosed in the present specification.

Table 1 also shows the distance between the lower surface substrate 2 and the through-hole chip 3, the height of the channel wall 5, and the film thickness of the through-hole chip 3 in the comparative example. Table 1 also shows the specimen utilization ratio of the measurement cell in the comparative example. The specimen utilization ratio was calculated as the ratio of (volume b:the volume of the specimen 11 injected into the through-hole of the through-hole chip 3) to (volume a:the sum of the total volume of through-holes of through-hole chips 3 and the volume of the space formed between the lower surface substrate 2 and the through-hole chips 3). The specimen utilization ratio of the measurement cell in the comparative example was 20%, which was lower than those in Examples 1 to 6. The following may be a cause for this result in the comparative example. There is no channel for controlling the liquid flow in the space formed between the lower surface substrate 2 and the through-hole chip 3, resulting in a failure in the introduction of the specimen 11. On the other hand, in Examples 1 to 6, it has been found that the specimen 11 can be introduced into the space formed between the lower surface substrate 2 and the through-hole chip 3 and into the entire through-holes of the through-hole chip 3 by placing the channel 10 for controlling the liquid flow in the space formed between the lower surface substrate 2 and the through-hole chip 3, achieving a specimen utilization ratio of 60% or more. Therefore, it has been found that a measurement cell having a high specimen utilization ratio can be manufactured by the technology disclosed in the present specification.

<PCR Amplification of Gene in Through-Hole>

Table 1 further shows the results of observing fluorescent bright spots in each Example and the comparative example. Each measurement cell was subjected to 40 temperature cycles of 98° C. (30 s) to 60° C. (120 s). When a fluorescence image of the surface of the through-hole chip 3 was observed before the temperature cycles, no fluorescence was observed. However, when a fluorescence image of the surface of the through-hole chip 3 was observed after the temperature cycles, a plurality of fluorescent bright spots were observed. The number of fluorescent bright spots on the surface of the through-hole chip was counted. The number of bright spots was almost the same as the value obtained by multiplying the copy number (1000 copies) of DNA in the specimen 11 by the specimen utilization ratio. From this result, it has been found that DNA can be isolated in the through-hole by the measurement cell manufacturing method according to the present disclosure, and the isolated DNA can be PCR amplified in the through-hole by applying temperature cycles to the prepared measurement cell 1.

TABLE 1

| | Layout of channel wall | Distance between lower surface substrate and though-hole chip [μm] | Height of channel wall [μm] | Film thickness of though-hole chip [μm] | Specimen utilization ratio [%] | Number of fluorescent bright spots [pieces] |
|---|---|---|---|---|---|---|
| Example 1 | Trench | 50 | 40 | 300 | 81.0 | 800 |
| Example 2 | Trench | 100 | 80 | 300 | 68.1 | 690 |
| Example 3 | Trench | 140 | 120 | 300 | 60.8 | 590 |

TABLE 1-continued

|  | Layout of channel wall | Distance between lower surface substrate and though-hole chip [μm] | Height of channel wall [μm] | Film thickness of though-hole chip [μm] | Specimen utilization ratio [%] | Number of fluorescent bright spots [pieces] |
|---|---|---|---|---|---|---|
| Example 4 | Trench | 50 | 40 | 200 | 74.0 | 750 |
| Example 5 | Trench | 50 | 40 | 500 | 87.7 | 860 |
| Example 6 | Strip/one stroke | 50 | 40 | 300 | 80.2 | 800 |
| Comparative Example | No channel wall | 50 | 0 | 300 | 20.0 | 200 |

REFERENCE SIGNS LIST 1 measurement cell
2 lower surface substrate
3 through-hole chip
4 upper surface substrate
5 channel wall
6 solution inlet to lower surface substrate side
7 solution inlet to upper surface substrate side
8 solution outlet from lower surface substrate side
9 solution outlet from upper surface substrate side
10 channel
11 specimen
12 air
13 oil

The invention claimed is:

1. A manufacturing method for manufacturing a measurement cell containing a liquid specimen,
the measurement cell including
a through-hole chip having a through-hole through which a liquid is introduced by capillary force,
a lower surface substrate placed to face the through-hole chip via a lower surface side space, and
an upper surface substrate placed to face the through-hole chip via an upper surface side space,
the lower surface substrate having a channel wall protruding from the lower surface substrate toward the through-hole chip to constitute a channel that guides a flow of liquid in the lower surface side space,
the manufacturing method comprising:
an introduction step of introducing the specimen into the through-hole by introducing a solution containing the specimen into the lower surface side space;
a step of discharging the solution remaining in the lower surface side space from the lower surface side space;
a step of introducing, into the lower surface side space, an anti-drying liquid that prevents drying of the specimen introduced into the through-hole; and
a step of introducing, into the upper surface side space, an anti-drying liquid that prevents drying of the specimen introduced into the through-hole,
wherein the channel has a shape that guides a flow of the solution from an inlet for introducing the solution into the lower surface side space toward an outlet for discharging the solution from the lower surface side space,
wherein the channel has a trench shape that guides the flow of the solution by extending along a direction in which the flow of the solution is generated between the inlet and the outlet, and
wherein the lower surface substrate includes a plurality of the channels each having the trench shape by including a plurality of the channel walls extending along the direction.

2. The manufacturing method according to claim 1, wherein the introduction step includes introducing the solution along a second direction that is not parallel to a first direction in which the through-hole extends.

3. The manufacturing method according to claim 1,
wherein the through-hole extends along a first direction that is not parallel to the lower surface substrate, and
wherein the introduction step includes introducing the solution along a second direction parallel to the lower surface substrate.

4. The manufacturing method according to claim 1, wherein the inlet and the outlet are disposed diagonally to each other in the lower surface side space.

5. The manufacturing method according to claim 1, wherein each channel of the plurality of channels is configured as one path that does not branch between the inlet and the outlet.

6. The manufacturing method according to claim 5, wherein the path continuously extends between the inlet and the outlet.

7. The manufacturing method according to claim 1, wherein an inner wall of the through-hole is hydrophilic.

8. The manufacturing method according to claim 1, wherein the upper surface substrate transmits light.

9. A measurement cell containing a liquid specimen, the measurement cell comprising:
a through-hole chip having a through-hole through which a liquid is introduced by capillary force;
a lower surface substrate placed to face the through-hole chip via a lower surface side space; and
an upper surface substrate placed to face the through-hole chip via an upper surface side space,
wherein
the lower surface substrate has a channel wall protruding from the lower surface substrate toward the through-hole chip to constitute a channel that guides a flow of liquid in the lower surface side space,
the through-hole contains the specimen,
the lower surface side space contains an anti-drying liquid that prevents drying of the specimen contained in the through-hole,
the upper surface side space contains an anti-drying liquid that prevents drying of the specimen contained in the through-hole,
the channel has a shape that guides a flow of a solution from an inlet for introducing the solution into the lower surface side space toward an outlet for discharging the solution from the lower surface side space,
the channel has a trench shape that guides the flow of the solution by extending along a direction in which the flow of the solution is generated between the inlet and the outlet, and
the lower surface substrate includes a plurality of the channels each having the trench shape by including a plurality of the channel walls extending along the direction.

* * * * *